June 25, 1929.                R. H. KIPP                1,718,790
                              CULTIVATOR
                         Filed May 10, 1928
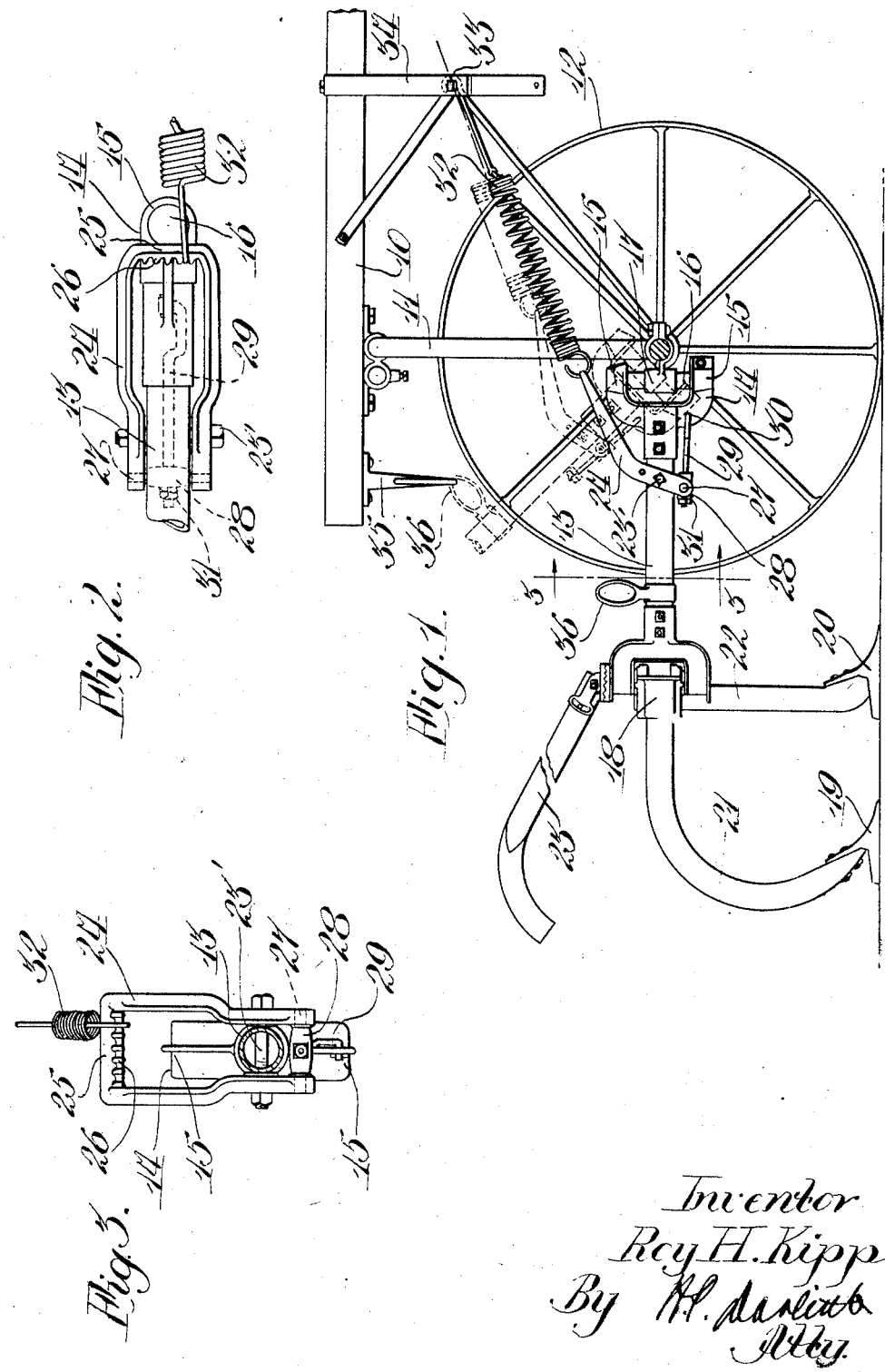

Patented June 25, 1929.

1,718,790

UNITED STATES PATENT OFFICE.

ROY H. KIPP, OF CHICAGO, ILLINOIS, ASSIGNOR TO INTERNATIONAL HARVESTER COMPANY, A CORPORATION OF NEW JERSEY.

CULTIVATOR.

Application filed May 10, 1928. Serial No. 276,528.

This invention relates to a cultivator and more particularly to an improved construction of beam control mechanism.

An object of the invention is to provide a cultivator beam control mechanism which shall be susceptible of advantageous manufacture and possessing superiorities in operation and use.

A further object of the invention is to provide a cultivator beam counter-balancing device of improved construction.

The invention is illustrated in the accompanying drawings, in which:

Figure 1 is a side elevation of a cultivator having the improved beam control mechanism applied thereto;

Figure 2 is a detail plan of parts of the improved mechanism; and

Figure 3 is a combined sectional view and elevation taken substantially on the line 3—3 of Figure 1.

In the drawings, the cultivator comprises a tongue 10, the arch axle 11, the supporting wheels 12, and the cultivator beam 13 pivotally connected with the axle so as to be capable of swinging on an upright axis and a horizontal axis.

The means whereby the cultivator beam 13 is connected with the axle includes a bracket 14 having sockets 15 for receiving the ends of the trunnion 16 about the upright axis of which the beam 13 may swing. The member 16 is preferably carried by a casting 17 which is pivotally mounted on the axle so as to swing upwardly or downwardly upon a substantially horizontal axis.

The cultivator beam carries a crossbar 18 to which cultivator shovels 19 and 20 are secured by the standards 21 and 22, respectively. The cultivator beam is guided by the operator who walks at the rear of the machine and grasps the handle 23 which is rigidly secured to the cultivator beam.

A pin 23' extends through the cultivator beam 13, as indicated in Figure 3 of the drawings. Upon this pin is pivotally mounted a member herein shown as the yoke 24. This yoke is preferably formed with relatively angled parts, as indicated in Figure 1. The front part of the yoke is a crosspiece 25 formed with notches 26 for a purpose mentioned below. The yoke straddles the cultivator beam, as shown in Figure 3, and has in its rearward and lower ends holes 27 in which is pivoted a pivot block 28.

The pivot block is formed with a fore and aft bore which slidably receives a link 29 preferably pivotally secured to the bracket 14 at 30, as indicated in Figure 1 of the drawings. When the cultivator beam is moved to the position indicated in the dotted lines in Figure 1, the link 29 slides through the pivot block 28. When the cultivator beam is lowered from its dotted line position, the pivot block abuts against stop 31 adjustably secured on the rearward end of the link 29. Positioned in one of the notches 26 is the hook end of a spiral spring 32, the other end of which is pivotally secured at 33 to a support 34 secured to the tongue 10, as indicated in the drawings. The spring 32 tends to move the cultivator beam toward one side or the other of the particular notch in which its hooked end is positioned.

The cultivator beam is held in its dotted line position by the engagement of a hook 35 with an eye 36 carried by the beam.

What is claimed as new is:

1. A cultivator comprising, in combination, a support, a rearwardly extending cultivator beam pivotally secured to the support so as to be capable of swinging on an upright axis and on a substantially horizontal axis relative thereto, a yoke pivotally mounted on the cultivator beam, a counter-balancing device connected to the front end of the yoke and anchored to the support, a link pivoted with respect to the beam and positioned below the cultivator beam and extending rearwardly substantially between the lower ends of the yoke, a pivotal connection between the yoke and the link, and a stop adjustably secured upon the link in position to engage a part carried by the yoke.

2. A cultivator comprising, in combination, a support, a cultivator beam pivotally connected with respect to the support on a substantially horizontal axis near its forward end, a yoke straddling the cultivator beam and pivotally connected thereon on a substantially horizontal axis extending transversely of the beam, a part of the yoke extending below part of the beam, a link below the cultivator beam and pivotally mounted at a position below the cultivator beam near its forward end, a pivotal connection between the rearward end of the link and the lower part of the yoke, an adjustable stop carried by the link, a part of the yoke extending upwardly and forwardly before the cultivator beam, and the counter-balancing device connecting the upper end of the yoke and the support.

3. A cultivator comprising, in combination, a support, a rearwardly extending cultivator beam pivotally mounted with respect to the support so as to be capable of swinging on an upright axis and on a substantially horizontal axis, a yoke pivotally mounted on a pivot pin extending through the cultivator beam, a coil spring secured to the front end of the yoke and anchored to the support forwardly of the cultivator beam, a part rigid with the forward end of the cultivator beam and extending therebelow, a link pivoted on said part below the longitudinal axis of the cultivator beam and extending rearwardly substantially between the lower ends of the yoke, a pivot block pivotally mounted between the lower ends of the yoke and formed with a fore and aft bore for receiving the link, and a stop adjustably secured upon the link rearwardly of the pivot block.

In testimony whereof I affix my signature.

ROY H. KIPP.